UNITED STATES PATENT OFFICE.

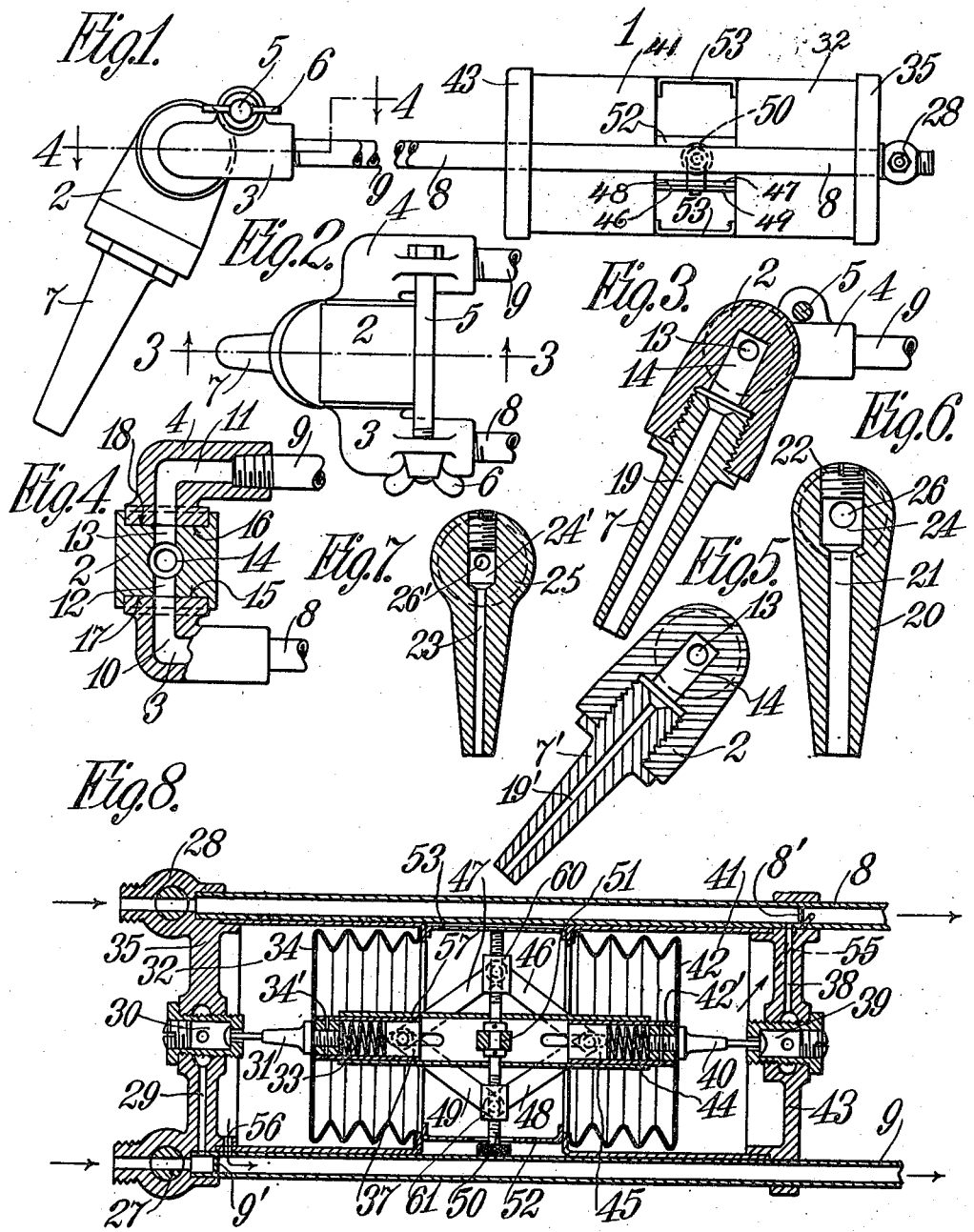

HENRY CAVE, OF SPRINGFIELD, MASSACHUSETTS.

TORCH APPARATUS.

1,191,397.  Specification of Letters Patent.  Patented July 18, 1916.

Application filed October 16, 1914. Serial No. 866,946.

*To all whom it may concern:*

Be it known that I, HENRY CAVE, a citizen of the United States of America, residing at Springfield, in the county of Hampden and State of Massachusetts, have invented certain new and useful Improvements in Torch Apparatus, of which the following is a specification.

This invention relates to a torch apparatus and particularly such an apparatus adapted for the welding of metals and more particularly to such apparatus in which a jet of combustible gas, such as acetylene, is used in conjunction with a combustion supporting jet of oxygen.

Such apparatus is, in general, well known. The efficiency in welding operations with such apparatus depends directly upon the maintenance of the exact ratio or proportions between the volumes of oxygen and the combustible gas. Theoretically, the correct ratio of the constituent gases in the oxy-acetylene process is one to one. Heretofore, so far as I am aware, a one to one mixture has not been obtained in practice. My experience has been that it is impossible with the ordinary apparatus to obtain and maintain the exact theoretical ratio between the two gases on account of certain inherent defects in the construction of the apparatus. It is believed that one principal reason for the failure to obtain a proper ratio of the burning gases can be attributed to the so-called "injector action" of one gas on the other. For example, gas emerging from an orifice in one passage and passing by an orifice from another passage increases the flow of gas from the second passage into the common passage. This action results in the delivery of an increased amount of gas from the second orifice and thus affects the ratio of the two gases.

An object of my invention is to provide a welding apparatus in which a one to one mixture of the gases will be more closely attained than in any apparatus heretofore known, so far as I am aware.

Another object is to provide suitable means to regulate the pressure of the two gases so that they will be maintained equal.

Another object is to provide a welding "torch" of novel form in which the "injector effect" is eliminated and in which the gases are thoroughly and properly mixed in the desired ratio.

A further object of the invention is to provide means to vary equally and simultaneously the pressure of the gases.

Other objects will appear in the detail description and annexed claims.

In general, I provide a pressure regulating apparatus wherein the pressure of one constituent gas of the mixture is balanced against the pressure of the other. With such a device, a variation in pressure of one gas causes a like variation in the pressure of the other gas, and the device operates to constantly maintain the pressures equal. In practice, different classes of work require jets of various sizes, and, to meet this requirement, it is desirable to employ orifices in the torch of various sizes. The change in the size of the orifices furthermore may necessitate a change in the pressure of the gas in order to maintain the proper volume of gas at the proper velocity. I provide with my device, therefore, suitable means operable to equally and simultaneously vary the pressure of each gas within the necessary limits. In order to eliminate the "injector action" of one gas on the other, I make use of a torch in which the two gases pass into the mixing chamber under identical conditions as to their relation to each other and preferably from oppositely disposed orifices into a common mixing chamber. By thus separately bringing the two gases into the mixing chamber under identical conditions, the injector action is entirely eliminated. Furthermore, a result incident to the preferred arrangement is a thorough mixture of the two constituents since each impinges directly on the other at high velocity. The advantage of bringing the two gases into the mixing chamber under identical conditions is that under variable outside influences, such as the temperature and the resistance offered to the flowing of the gases through their respective passages, will affect each gas alike, and the proportionate mixture will be maintained constant. So far as I am aware, the torches heretofore used have been provided with large acetylene pockets adjacent the mixing chamber and a small oxygen passage leading to the chamber so that a variation in temperature will affect the acetylene more than the oxygen with a consequent variation in the mixture according to the temperature condition.

A preferred form of my invention is illustrated in the accompanying drawings in which—

Figure 1 is an elevational view of the torch and pressure regulating apparatus; Fig. 2 is a plan view of the torch; Fig. 3 is a sectional elevation taken on the line 3—3 of Fig. 2 and looking in the direction of the arrows; Fig. 4 is a sectional plan view of the torch taken on the line 4—4 of Fig. 1 and looking in the direction of the arrows; Fig. 5 is a view similar to Fig. 3 showing a nozzle of different size; Fig. 6 and Fig. 7 are views corresponding to Figs. 3 and 5 showing a modification of the nozzle; and Fig. 8 is a sectional elevation of the regulating apparatus shown in Fig. 1.

Referring to the drawings, particularly Figs. 1 to 4, inclusive, 1 represents the pressure regulating apparatus to be later described. Acetylene and oxygen pass from this apparatus 1 through pipes 8 and 9 to elbows 3 and 4, respectively. The elbows 3 and 4 are formed with passageways 10 and 11 which are of equal cross-sectional area. The elbows 3 and 4 are, furthermore, provided with circular flanges 17 and 18 which are accurately finished and ground to size. The flanges 17 and 18 are adapted to be seated in finished circular recesses 15 and 16, respectively, which are formed in the central body portion 2 of the torch. The flanges 17 and 18 are held against the member 2 by a bolt 5 and a winged nut 6. The body portion 2 is formed with a central hole 14 which forms a mixing chamber, and holes 12 and 13 lead from the passages 10 and 11, respectively, to this chamber 14. These holes 12 and 13 register with the passages 10 and 11, respectively, and enter the mixing chamber 14 at exactly opposite points. The body 2 is provided with the usual tip or nozzle 7 having a passage 19 which communicates between the mixing chamber 14 and the end of the nozzle 7. It will be noted that the connection of the elbows 3 and 4 to the body 2 of the torch permits circular adjustment of the nozzle 7.

As has been previously noted, different classes of work require jets of varying size which necessitates nozzles or tips having passages therein of varying sizes. I may provide for this condition in either of two ways. The nozzle 7, shown in connection with Figs. 1 to 4, is separable from the torch body. Therefore, I may employ a number of nozzles 7 which have passages of various sizes but which all fit into a common torch body 2. Thus, Fig. 5 shows a nozzle 7', adapted to be secured to the body 2, which has a passageway 19' of smaller area than the passageway 19 of the nozzle 7. The second and preferable method is to form the nozzle and body in an integral piece, as shown in Figs. 6 and 7. The member 20, shown in Fig. 6, is formed with the circular recesses similar to those shown in Fig. 4 to receive the elbows 3 and 4. A vertical hole 21 is drilled through the member 20, and this hole is counterbored, forming a mixing chamber 24. The chamber 24 is closed by a screw 22 and holes 26 communicate from the chamber 24 to the elbows 3 and 4. Fig. 7 shows a similar member 25 in which the mixing chamber 24', the holes 26', and the passage 23 are all of smaller size than the corresponding portions of the member 20. I prefer to form my nozzle as shown in Figs. 6 and 7, since the apertures 26 and mixing chamber 24 may be also reduced as the passage 21 is reduced in size, thus insuring the preferred proportion between the several passages and the mixing chamber whereby a mixture of one to one in volumes of the gases is obtained. The nozzle shown in Fig. 3 permits the reduction of the passageway 19 only and is satisfactory within certain limits of sizes in the nozzle passageway 19.

The apparatus for regulating and maintaining equal the pressures of the gases will now be described, and reference is to be made to Figs. 1 and 8. The apparatus, in general, comprises two end frames 35 and 43 substantially circular in shape. Secured to the frames 35 and 43 are cylindrical drums 32 and 41, respectively. The drums 32 and 41 are closed at one end by the frames 35 and 43 and at the other and adjacent ends by flexible expandable members 34 and 42. The pipes 8 and 9 pass through the frames 35 and 43 and lie outside the drums 32 and 41. Adjacent the frame 35, the usual cocks 27 and 28 are provided to connect the pipes 9 and 8, respectively, to the gas generators. Adjacent the frame 35 and in the pipe 9 is a plug 9' which diverts the gas therein to a passage 29 in the frame 35. Similarly, the pipe 8 has a plug 8' therein to divert the gas from the supply to a cored passage 38 in the end frame 43. These passages 29 and 38 lead to chambers 30 and 39, respectively. The latter are provided with valves 31 and 40 which are adapted to govern the entrance of the gases to the drums 32 and 41, respectively. The valves 31 and 40 are fastened suitably to members 34 and 42 and to sleeves 34' and 42', respectively. The sleeves 34' and 42' are freely slidable in a sleeve 57 which supports and alines these members. Within the sleeve 57 is an upstanding lug 51 and rotatably mounted in the latter is a rod 50. The rod 50 is provided with left and right hand threaded portions disposed on opposite sides of the lug 51. Upon these left and right hand threaded portions are nuts 60 and 61. The nut 60 is connected by links 46 and 47 to plugs 45 and 37, respectively; the latter are freely slidable within their sleeves 42' and 34'. The nut 61 is similarly connected to the plugs 45 and 37 by links 48 and 49, respectively. Springs 33 and 44 are interposed between the plugs 37 and 45 and the valves 31 and 40. The threaded rod 50 passes through a slotted hole in a bracing member 52 and is provided with a knurled head whereby it may readily be turned. The member 52, as well as members 53 shown in Fig. 1, acts as a brace between the drums 32 and 41. Communication between the drums 32 and 41 and the pipes 9 and 8 is afforded by holes 56 and 55, respectively.

The operation of the pressure regulating device will now be described.

The springs 33 and 44 are first adjusted by the rod 50 to open the valves 31 and 40 when the gas in the drums 32 and 41, respectively, falls below the required pressure. The force exerted by these springs is obviously equal to the desired pressure of the gas acting on the area of the flexible members 34 and 42. The apparatus is symmetrical in every detail, and the springs 33 and 44 are exactly the same in every respect. Furthermore, the rod 50, when turned, will compress the springs 33 and 44 an equal amount by reason of the nut and link connection shown. Consequently, the valves 31 and 40 will open at precisely the same pressure. Assuming that the valves 31 and 40 have been properly adjusted, it is clear that, as soon as gas is drawn from the drums 32 and 41, the pressure will decrease and allow the valves 31 and 40 to open simultaneously under the action of the springs 33 and 44, respectively. Thus, oxygen and acetylene will pass from the generators through the pipes 8 and 9 and passages 29 and 38 to the proper drums 32 and 41. As soon as the pressures of the gases reach the desired value, the springs 33 and 44 will be compressed, and the valves 31 and 40 will close. Thus, it is clear that the pressure in each drum 32 and 41 will be maintained constant.

It is to be noted particularly that the valves 31 and 40, sleeves 34' and 42', plugs 37 and 45, respectively, together with the link connections and threaded rod 50, are freely slidable to and fro within the drums. Consequently, if, for any reason, the pressure in the drum 32, for example, becomes greater than that in drum 41, the entire central structure described will slide to the right as viewed in Fig. 8. Thus, the valve 31 will be immediately closed, and the valve 40 will be opened to permit entrance of gas until the pressures in the two drums are again equal. Thus, by this balanced valve construction, the pressure of each gas will be maintained equal and at a constant value. Furthermore, the pressure of each gas may be varied equally or in a definite ratio and simultaneously by the rod 50, as heretofore described.

In connection with the torch arrangement shown in Figs. 1 to 4, the gases from the supply pipes 8 and 9 emerge from oppositely disposed apertures 12 and 13. The opposite arrangement of these apertures does not permit one gas from one aperture to flow past the other aperture, and, therefore, no injector action is produced on either gas. The apertures can be arranged in other ways than directly opposite so long as they direct the gases into the mixing chamber under identical conditions. Consequently, the theoretical conditions obtained in the apparatus 1 are not modified by an injector action of one gas on the other. Therefore, since the apertures 12 and 13 are preferably exactly equal, the theoretically correct mixture will be very closely approximated in the chamber 14. Furthermore, in addition to the attainment of the desired proportions in the mixture, I obtain a thorough mixture of the two constituent gases. This is due to the fact that each gas, as it emerges from its aperture, impinges at high velocity directly upon the other gas. Consequently, a thorough mixture of theoretically correct proportions is obtained.

It is recognized that many modifications may be made in the structure herein disclosed without departing from the scope of my invention which is more truly defined in the appended claims than in the foregoing specific description.

What I claim is—

1. A torch apparatus, comprising, in combination, a torch body, a mixing chamber therein, a nozzle communicating with said chamber, oppositely disposed inlets to said chamber, a container for oxygen, a container for a combustible gas, connections between said containers and said inlets, valves in each of said containers mounted in opposed relation and balanced one against the other, said valves adapted to control the admission of gas to said containers, and means to vary the pressure in said containers equally and simultaneously.

2. A torch, comprising, in combination, a body portion, a mixing chamber formed therein, and a nozzle portion formed with a passageway therein in communication with said chamber, said body portion having an inlet for oxygen and an inlet for a combustible gas formed therein, said inlets arranged to enter said chamber from directly opposite points whereby the gases issuing from said passages impinge on each other and become thoroughly mixed in said chamber.

3. A torch, comprising, a body portion formed with a mixing chamber and an inlet thereto on either side thereof, said inlets being directly opposed one to the other, a nozzle removably mounted in said body having a passage therein adapted to communicate with said chamber, elbows on either side of said body, and means to secure the same thereto, said elbows formed with passages therein, adapted to register with said inlets.

HENRY CAVE.

Witnesses:
F. E. HARTWELL,
F. G. NEAL.